United States Patent
Ninomiya et al.

(10) Patent No.: US 7,604,358 B2
(45) Date of Patent: Oct. 20, 2009

(54) HARD-COATED ANTIGLARE FILM, POLARIZING PLATE, AND IMAGE DISPLAY

(75) Inventors: Masaki Ninomiya, Ibaraki (JP); Seiichi Kusumoto, Ibaraki (JP); Daisuke Hamamoto, Ibaraki (JP); Hiroyuki Takao, Ibaraki (JP); Takayuki Shigematsu, Ibaraki (JP)

(73) Assignee: Nitto Denko Corporation, Ibaraki-Shi (JP)

(*) Notice: Subject to any disclaimer, the term of this patent is extended or adjusted under 35 U.S.C. 154(b) by 0 days.

(21) Appl. No.: 11/748,199

(22) Filed: May 14, 2007

(65) Prior Publication Data
US 2007/0268587 A1    Nov. 22, 2007

(30) Foreign Application Priority Data

May 16, 2006  (JP) ............................. 2006-136083
Feb. 23, 2007  (JP) ............................. 2007-043373

(51) Int. Cl.
*G02B 27/00*  (2006.01)
(52) U.S. Cl. .................................................. 359/601
(58) Field of Classification Search ................. 359/599, 359/601
See application file for complete search history.

(56) References Cited

U.S. PATENT DOCUMENTS

| | | | |
|---|---|---|---|
| 6,343,865 B1 | 2/2002 | Suzuki | |
| 6,731,363 B2 | 5/2004 | Nakamura et al. | |
| 6,964,814 B2 | 11/2005 | Fujii et al. | |
| 7,354,163 B2 | 4/2008 | Suzuki et al. | |
| 2002/0085284 A1 | 7/2002 | Nakamura et al. | |
| 2004/0240070 A1 | 12/2004 | Suzuki et al. | |
| 2005/0096431 A1 | 5/2005 | Fujii et al. | |
| 2006/0052565 A1 | 3/2006 | Yoshioka et al. | |
| 2006/0132922 A1* | 6/2006 | Takao et al. ................. | 359/601 |
| 2008/0151376 A1 | 6/2008 | Suzuki et al. | |

FOREIGN PATENT DOCUMENTS

| | | |
|---|---|---|
| JP | 11305010 A | 11/1999 |
| JP | 2000/233611 A | 8/2000 |
| JP | 2002/202402 A | 7/2002 |
| JP | 2003/156605 A | 5/2003 |
| JP | 3507719 B2 | 12/2003 |
| JP | 2004/167827 A | 6/2004 |
| JP | 2005/77860 A | 3/2005 |
| WO | WO 01/37007 A1 | 5/2001 |
| WO | WO 03/067287 A1 | 8/2003 |

* cited by examiner

*Primary Examiner*—Joshua L Pritchett
(74) *Attorney, Agent, or Firm*—Westerman, Hattori, Daniels & Adrian, LLP.

(57) ABSTRACT

A hard-coated antiglare film that has excellent antiglare properties, prevents a glare phenomenon from occurring, and prevents white blur from occurring to have excellent display contrast in bright light. The hard-coated antiglare film includes a transparent plastic film substrate and a hard-coating antiglare layer containing fine particles. The hard-coating antiglare layer is formed on at least one surface of the transparent plastic film substrate. The hard-coating antiglare layer has a surface with an uneven structure. The hard-coated antiglare film has a total haze value ht in the range of 40 to 70%. The relationship between the total haze value ht and an inner haze value hi obtained due to scattering inside the hard-coating antiglare layer is a relationship of the total haze value ht≦the inner haze value hi.

8 Claims, 2 Drawing Sheets

HARD-COATED ANTIGLARE FILM, POLARIZING PLATE, AND IMAGE DISPLAY

CROSS-REFERENCE TO RELATED APPLICATIONS

This application claims priority from Japanese Patent Application Nos. 2006-136083 filed on May 16, 2006 and 2007-043373 filed on Feb. 23, 2007 the entire contents of which are hereby incorporated by reference.

FIELD OF THE INVENTION

The present invention relates generally to a hard-coated antiglare film, a polarizing plate, and an image display.

BACKGROUND OF THE INVENTION

With technical improvement in recent years, liquid crystal displays (LCDs), plasma display panels (PDPs), electroluminescence displays (ELDs), etc. have been developed in addition to conventional cathode ray tubes (CRTs) as image displays and have been used practically. As LCDs have been technically improved to provide wide viewing angles, high resolution, high response, good color reproduction, and the like, applications of LCDs are spreading from laptop personal computers and monitors to television sets. In a basic LCD structure, a pair of flat glass substrates each provided with a transparent electrode are opposed via a spacer to form a constant gap, between which a liquid crystal material is placed and sealed to form a liquid crystal cell, and a polarizing plate is formed on the outside surface of each of the pair of glass substrates. Conventionally, in order to provide LCDs with antiglare properties, the surface of a polarizing plate interposed between two transparent film substrates is treated to be roughened using sandblast, an embossing roll, chemical etching, etc., and thereby a fine uneven structure is formed at the surface. Furthermore, there is a technique of providing LCDs with antiglare properties using a hard-coated antiglare film.

A hard-coated antiglare film is used in which a thin hard-coating antiglare layer with a thickness of 2 to 10 μm has been formed on one or both surface of a transparent plastic film substrate. The hard-coating antiglare layer is formed using resins for forming a hard-coating antiglare layer such as thermosetting resins or ultraviolet (UV)-curable resins and fine particles. The surface of the hard-coating antiglare layer is provided with unevenness by the fine particles so as to provide antiglare properties.

With application of flat displays such as LCDs to home televisions, the following improvements are demanded: improvements in display quality such as improvements in viewing angle, rapid response, definition, etc.; improvements in antiglare properties for preventing indoor fluorescent light, sunlight incident from a window, an image of a viewer, etc. from being reflected onto a display surface; and a further improvement in display contrast in bright light, i.e. an improvement in depth of black in black display. Low display contrast in bright light causes a phenomenon that an image display surface with a hard-coated antiglare film attached thereto looks white and blurred, i.e. a phenomenon of so-called "white blur".

However, in a hard-coated antiglare film, there is a conflicting relationship (a trade-off relationship) between the improvement in antiglare properties and the improvement in display contrast in bright light to be achieved when it is used for an image display. Accordingly, when the display contrast is considered to be important, the hard-coating antiglare layer surface is allowed to have less unevenness to have higher smoothness and thereby the antiglare properties are sacrificed slightly. On the other hand, when the antiglare properties are considered to be important, the hard-coating antiglare layer surface is allowed to have a sufficiently uneven structure and thereby the display contrast in bright light is sacrificed. These are general techniques. Hence, in order to improve the display contrast in bright light while maintaining the antiglare properties, a hard-coated antiglare film has been developed that is provided with an antireflection layer (low-refractive-index layer) on a hard-coating antiglare layer, and it is being used in practical application. However, even in the case of a hard-coated antiglare film provided with an antireflection layer, when it is used for a high-definition LCD, there are problems in that a glare (high and low brightness portions) phenomenon occurs at the LCD surface, and the display contrast in bright light is not sufficiently high and thereby white blur cannot be prevented sufficiently from occurring.

In order to prevent the glare phenomenon from occurring, for instance, there is a method in which a hard-coating antiglare layer is formed using a large number of fine particles and thereby a number of fine uneven structures are formed continuously at the hard-coating antiglare layer surface. In this method, however, the antiglare properties are improved and the glare phenomenon also is improved, but irregular reflection of outside light occurs at the surface, which results in occurrence of white blur. Particularly, in the case of black display, white blur occurs conspicuously, and as a result, a problem of deterioration in display contrast in bright light occurs, for example.

Accordingly, in designing a hard-coated antiglare film to be used for high-definition LCDs, there are proposed techniques of controlling light diffusion inside the hard-coating antiglare layer to prevent the glare phenomenon from occurring, and light diffusion properties of the hard-coating antiglare layer surface to prevent white blur from occurring. For instance, a hard-coated antiglare film has been proposed in which the surface haze value is set in the range of 7 to 30% while the inner haze value is set in the range of 1 to 15% in the hard-coating antiglare layer (JP3507719). This hard-coated antiglare film, however, does not satisfactorily prevent the glare phenomenon from occurring. In addition, an antiglare antireflection film having at least one low-refractive-index layer on a transparent support and an antiglare layer between the transparent support and the low-refractive-index layer has been proposed in which the haze value obtained due to light scattering inside the antiglare layer is set in the range of 1 to 60% while the haze value obtained due to light scattering at the antiglare layer surface is set in the range of 1 to 20% (JP-A No. 2002-202402). Furthermore, a light scattering film has been proposed in which in a hard-coating antiglare layer, the surface haze value hs is set in the range of 0.5 to 30% while the inner haze value hi is set in the range of 15 to 80%, and the sum of the surface haze value hs and the inner haze value his 30 to 90% (JP-A No. 2003-156605). Moreover an antireflection film has been proposed in which in a light diffusion layer, the inner haze value is set in the range of 30 to 60% while the surface haze value is set at 1% or lower (JP-A No. 2005-77860). However, in the aforementioned antiglare antireflection film, light scattering film, and antireflection film, it is difficult to achieve both prevention of the glare phenomenon and improvement in the display contrast in bright light (prevention of white blur) simultaneously.

SUMMARY OF THE INVENTION

The present invention therefore is intended to provide a hard-coated antiglare film that maintains antiglare properties, prevents a glare phenomenon from occurring on the screen, and is excellent in display contrast in bright light even when it is used for a high-definition LCD, and a polarizing plate and an image display, each of which includes the same.

In order to achieve the above-mentioned object, the hard-coated antiglare film of the present invention includes a transparent plastic film substrate and a hard-coating antiglare layer that is formed on at least one surface of the transparent plastic film substrate and that is formed of a material for forming the hard-coating antiglare layer. The material contains fine particles and a hard-coating resin. The hard-coating antiglare layer has a surface with an uneven structure. The hard-coated antiglare film has a total haze value ht in the range of 40 to 70%, while the relationship between the total haze value ht and an inner haze value hi obtained due to scattering inside the hard-coating antiglare layer is a relationship of the total haze value ht≦the inner haze value hi, where the total haze value ht is a haze value of the whole hard-coated antiglare film, the inner haze value hi=a haze value A−a haze value B, the haze value A is a haze value of a whole hard-coated antiglare film that is obtained by forming a smooth surface of a hard-coating resin alone on said hard-coating antiglare layer of said hard-coating antiglare film, wherein said smooth surface of a hard-coating resin alone is made from a same resin as said hard-coating resin, and the haze value B is a haze value of a whole laminate that is obtained by forming a hard-coating resin alone on a transparent plastic film substrate, wherein said hard-coating resin alone layer is made the same as said hard-coating antiglare later except that it is made of the hard-coating resin alone and said transparent plastic film substrate is made the same as said transparent plastic film substrate of said hard-coating antiglare film.

A polarizing plate of the present invention includes a polarizer and the hard-coated antiglare film of the present invention.

An image display of the present invention includes at least one of a hard-coated antiglare film of the present invention and a polarizing plate of the present invention.

In the hard-coated antiglare film of the present invention, the total haze value ht is set in the aforementioned range, while the total haze value ht and the inner haze value hi are allowed to have the aforementioned relationship therebetween. Accordingly, when it is used for high-definition LCDs, it has excellent antiglare properties, prevents the glare phenomenon from occurring, has excellent display contrast in bright light, prevents white blur from occurring, and particularly improves the depth of black in black display. Hence, when a hard-coated antiglare film of the present invention or a polarizing plate including the same is used for an image display, particularly a high-definition LCD, an image display with excellent display properties can be obtained. The hard-coated antiglare film of the present invention also can be used for image displays other than high-definition LCDs.

DESCRIPTION OF THE EMBODIMENTS

In the hard-coated antiglare film of the present invention, as described above, the total haze value ht is in the range of 40% to 70%. When the total haze value ht is lower than 40%, glare cannot be sufficiently prevented from occurring. On the other hand, when the total haze value ht exceeds 70%, the transmittance is decreased. The total haze value ht is preferably in the range of 40 to 55%, more preferably in the range of 43 to 55%.

Figure 1:
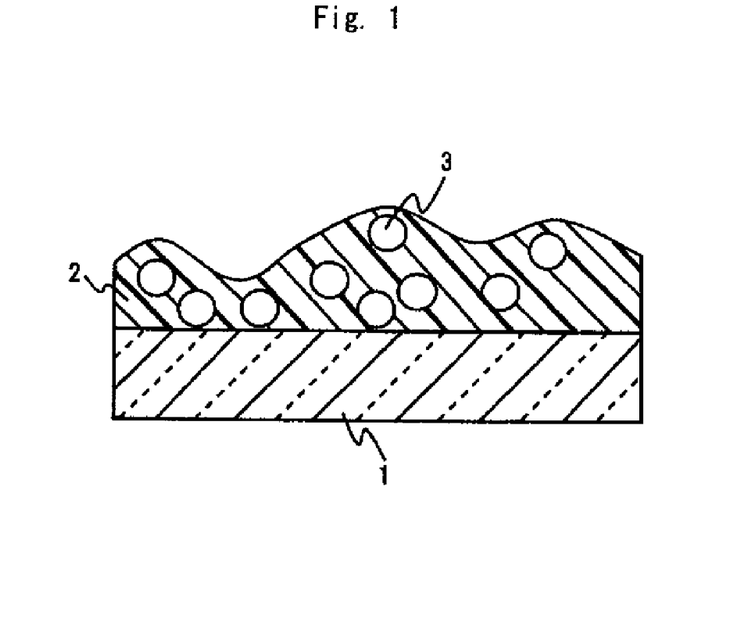
FIG. 1 is a cross-sectional view schematically showing the structure of a hard-coated antiglare film according to one embodiment of the present invention.

In the hard-coated antiglare film of the present invention, the total haze value ht denotes a haze ratio of the whole hard-coated antiglare film. FIG. 1 shows an example of the hard-coated antiglare film of the present invention. As shown in FIG. 1, the hard-coated antiglare film of this example has a configuration in which a hard-coating antiglare layer 2 containing a hard-coating antiglare resin and fine particles 3 is formed on a transparent plastic film substrate 1. The surface of the hard-coating antiglare layer 2 has an uneven structure and this allows the antiglare properties to be exhibited. In the hard-coated antiglare film of the present invention, a part of the surface of the hard-coating antiglare layer or the whole surface thereof can have the uneven structure. In the hard-coated antiglare film of this example, the hard-coating antiglare layer 2 is formed on one surface of the transparent plastic film substrate 1. The present invention, however, is not limited to this. The hard-coated antiglare film of the present invention may be a hard-coated antiglare film including hard-coating antiglare layers formed on both surfaces of the transparent plastic film substrate. The hard-coating antiglare layer of the hard-coated antiglare film of this example has a single-layer structure. However, the present invention is not limited to this. The hard-coating antiglare layer can have a laminated structure including at least two layers laminated together. The hard-coated antiglare film of the present invention can include an antireflection layer (low-refractive-index layer) formed on the hard-coating antiglare layer as described later.

In the hard-coated antiglare film of the present invention, the inner haze value hi is not particularly limited and is preferably in the range of 40 to 70%. When it is at least 40%, glare can be prevented more effectively from occurring. On the other hand, when it is 70% or lower, higher transmittance can be obtained. The inner haze value hi is preferably in the range of 43 to 70%, more preferably in the range of 50 to 60%.

Figure 2:
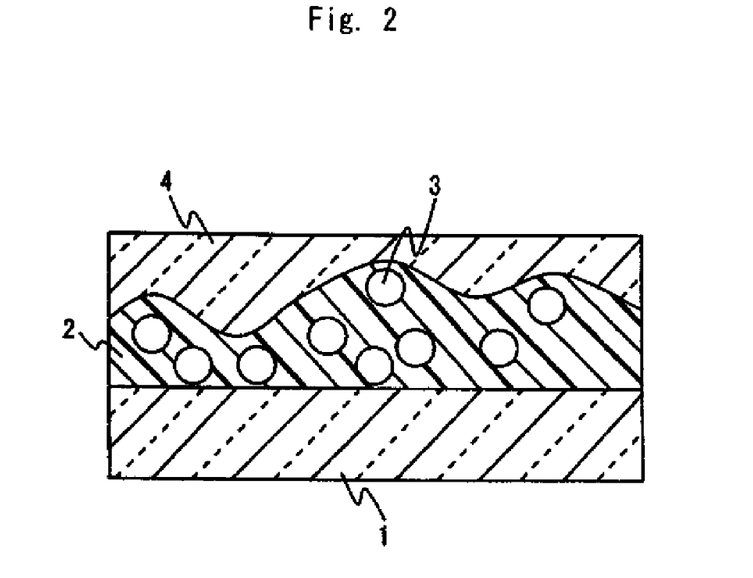
FIG. 2 is a schematic sectional view explaining an example of measurement of the haze value A that is required for determining the inner haze value hi of the present invention.
Figure 3:
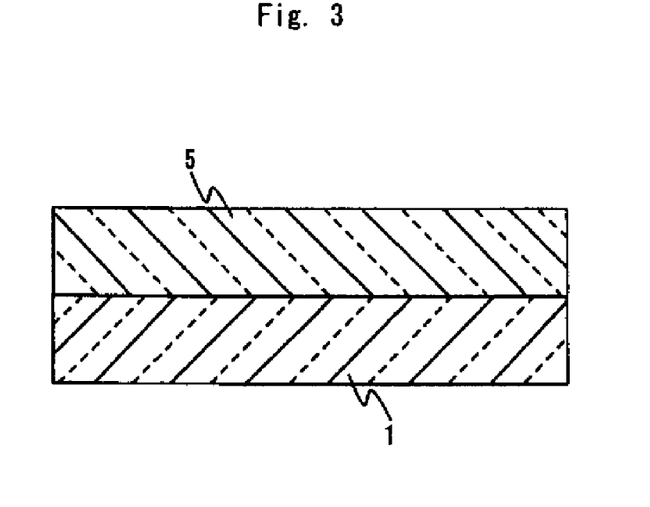
FIG. 3 is a schematic sectional view explaining an example of measurement of the haze value B that is required for determining the inner haze value hi of the present invention.

As described above, the inner haze value hi is defined as follows: the inner haze value hi=the haze value A−the haze value B. The haze value A is a haze value of the whole hard-coated antiglare film that is measured when the uneven surface of the hard-coating antiglare layer 2 formed of the hard-coating resin and fine particles 3 on the transparent plastic film substrate 1 is allowed to be a smooth surface 4 using the hard-coating resin as shown in FIG. 2, for example. On the other hand, the haze value B is a haze value of a whole laminate composed of the transparent plastic film substrate and a hard-coating layer 5 with a smooth surface in the case where the hard-coating layer 5 is formed of the hard-coating resin alone (without the fine particles) on the transparent plastic film substrate 1 as shown in FIG. 3, for example.

The relationship between the present invention and the effects thereof is surmised as follows, but the present invention is not limited by the surmise. That is, first, the change in haze value according to the hard-coating antiglare layer depends on light scattering at the surface of or inside the hard-coating antiglare layer. The surface scattering component alone allows antiglare properties to be obtained. However, in the case of no inner scattering component, particularly when the hard-coated antiglare film is used for a high-definition LCD (for example, at least 100 ppi), the possibility of the occurrence of glare increases, while the contrast in bright light deteriorates and white blur occurs when surface scattering increases. On the contrary, when the inner scattering component alone exists, usually the antiglare properties deteriorate due to the absence of surface scattering components. However, in the case of a hard-coating antiglare layer that satisfies the relationship of the total haze value ht≦the inner haze value hi specified in the present invention, since the surface scattering components have a function of collecting light, the hard-coating antiglare layer has effects of preventing contrast in bright light from deteriorating and white blur from occurring because less light is scattered at the surface while antiglare properties are maintained. Furthermore, in order to eliminate glare effectively, the total haze value ht is required to be in the range of 40 to 70%.

In the hard-coated antiglare film of the present invention, it is preferable that the average tilt angle θa in the uneven structure of the hard-coating antiglare layer surface be in the range of 0.4 to 1.5 degrees. When the average tilt angle θa is in the above-mentioned range, the uneven structure of the hard-coating antiglare layer surface can be smoothened, the antiglare properties can be improved effectively, white blur can be prevented effectively from occurring, the display contrast in bright light can be improved effectively, and the haze value can be in a suitable range. The average tilt angle θa is more preferably in the range of 0.5 to 1.2 degrees and further preferably in the range of 0.6 to 1.0 degree. In the present invention, the average tilt angle θa can be adjusted by suitably selecting, for example, the type of the hard-coating resin, the thickness of the hard-coating antiglare layer, the type of the fine particles, the weight average particle size of the fine particles, etc. Any person skilled in the art can obtain an average tilt angle θa in the predetermined range of the present invention without carrying out an excessive amount of trial and error.

In the present invention, the average tilt angle θa is a value defined by Expression (1) indicated below. The average tilt angle θa is a value measured by the method described later in the section of Examples.

$$\text{Average tilt angle } \theta a = \tan^{-1} \Delta a \tag{1}$$

Figure 4:
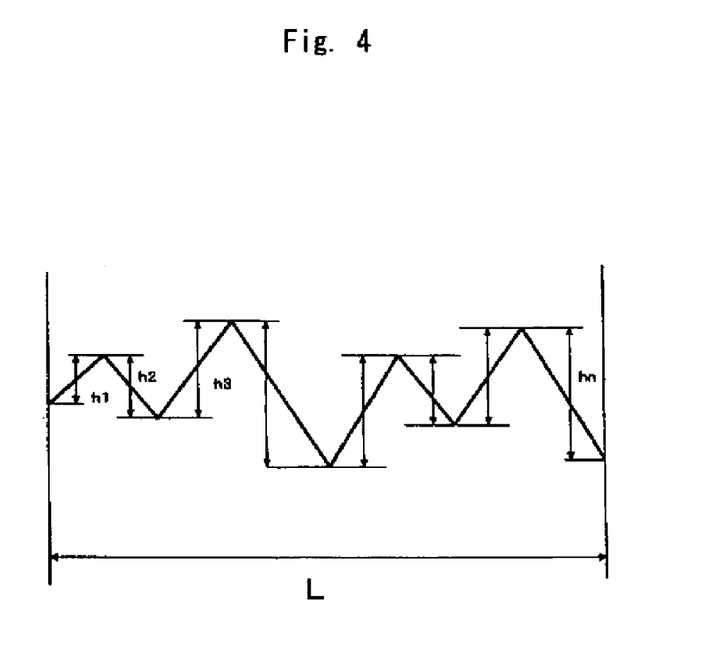
FIG. 4 is a schematic view showing an example of the relationship among the roughness curve, height h, and standard length L.

In Expression (1) described above, as indicated in Expression (2) below, Δa denotes a value obtained by dividing the sum total (h1+h2+h3 . . . +hn) of the differences (heights h) between adjacent peaks and the lowest point of the trough formed therebetween by the standard length L of the roughness curve defined in JIS B 0601 (1994 version). The roughness curve is a curve obtained by removing the surface waviness components with longer wavelengths than the predetermined one from the profile curve using a retardation compensation high-pass filter. The profile curve denotes a profile that appears at the cut surface when an object surface was cut in a plane perpendicular to the object surface. FIG. 4 shows examples of the roughness curve, height h, and standard line L.

$$\Delta a = (h1+h2+h3 \ldots +hn)/L \tag{2}$$

In the hard-coated antiglare film of the present invention, it is preferable that the hard-coating resin contains Component A, Component B, and Component C described below:

Component A: at least one of urethane acrylate and urethane methacrylate;

Component B: at least one of polyol acrylate and polyol methacrylate; and

Component C: a polymer or copolymer that is formed of at least one of

Components C1 and C2 described below, or a mixed polymer of the polymer and the copolymer, Component C1: alkyl acrylate having an alkyl group containing at least one of a hydroxyl group and an acryloyl group, and Component C2: alkyl methacrylate having an alkyl group containing at least one of a hydroxyl group and an acryloyl group.

In the hard-coated antiglare film of the present invention, it is preferable that the fine particles have a weight average particle size in the range of 6 to 10 μm.

In the hard-coated antiglare film of the present invention, it is preferable that an antireflection layer (low-refractive-index layer) is formed on the hard-coating antiglare layer. The antireflection layer may be a monolayer or may have a laminate structure with at least two layers laminated together.

The antireflection layer preferably contains hollow spherical silicon oxide ultrafine particles.

Next, the present invention is described in detail. The present invention, however, is not limited by the following description.

The hard-coated antiglare film of the present invention includes a transparent plastic film substrate and a hard-coating antiglare layer formed on one or both surfaces of the transparent plastic film substrate.

The transparent plastic film substrate is not particularly limited. Preferably, the transparent plastic film substrate has a high visible-light transmittance (preferably a light transmittance of at least 90%) and good transparency (preferably a haze value of at most 1%). Examples of the material for forming the transparent plastic film substrate include polyester type polymers, cellulose type polymers, polycarbonate type polymers, acrylics type polymers, etc. Examples of the polyester type polymers include polyethylene terephthalate, polyethylenenaphthalate, etc. Examples of the cellulose type polymers include diacetyl cellulose, triacetyl cellulose (TAC), etc. Examples of the acrylic type polymers include poly methylmethacrylate, etc. Examples of the material for forming the transparent plastic film substrate also include styrene type polymers, olefin type polymers, vinyl chloride type polymers, amide type polymers, etc. Examples of the styrene type polymers include polystyrene, acrylonitrile-styrene copolymer, etc. Examples of the olefin type polymers include polyethylene, polypropylene, polyolefin that has a cyclic or norbornene structure, ethylene-propylene copolymer, etc. Examples of the amide type polymers include nylon, aromatic polyamide, etc. The material for forming the transparent plastic film substrate also contain, for example, imide type polymers, sulfone type polymers, polyether sulfone type polymers, polyether-ether ketone type polymers, poly phenylene sulfide type polymers, vinyl alcohol type polymer, vinylidene chloride type polymers, vinyl butyral type polymers, allylate type polymers, polyoxymethylene type polymers, epoxy type polymers, blend polymers of the above-mentioned polymers, etc. Among them, those having small optical birefringence are used suitably. The hard-coated antiglare film of the present invention can be used as a protective film for a polarizing plate, for example. In such a case, the transparent plastic film substrate is preferably a film formed of triacetyl cellulose, polycarbonate, an acrylic polymer, a polyolefin having a cyclic or norbornene structure, etc. In the present invention, the transparent plastic film substrate may be a polarizer itself. Such a structure does not need a protective layer of TAC or the like and provides a simple polarizing plate structure and thus allows a reduction in the number of steps for manufacturing polarizing plates or image displays and an increase in production efficiency. In addition, such a structure can provide thinner polarizing plates. When the transparent plastic film substrate is a polarizer, the hard-coating antiglare layer serves as a protective layer in a conventional manner. In such a structure, the hard-coated antiglare film also functions as a cover plate, when attached to the surface of a liquid crystal cell.

In the present invention, the thickness of the transparent plastic film substrate is not particularly limited. For example, the thickness is preferably 10 to 500 μm, more preferably 20 to 300 μm, and most suitably 30 to 200 μm, in terms of strength, workability such as handling property, and thin layer property. The refractive index of the transparent plastic film substrate is not particularly limited. The refractive index is, for example, 1.30 to 1.80, preferably 1.40 to 1.70.

As described above, the hard-coating antiglare layer is formed, for example, using a material for forming the hard-coating antiglare layer containing Component A, Component B, and Component C described below:

Component A: at least one of urethane acrylate and urethane methacrylate;

Component B: at least one of polyol acrylate and polyol methacrylate; and

Component C: a polymer or copolymer that is formed of at least one of Components C1 and C2 described below, or a mixed polymer of the polymer and the copolymer, Component C1: alkyl acrylate having an alkyl group containing at least one of a hydroxyl group and an acryloyl group, and Component C2: alkyl methacrylate having an alkyl group containing at least one of a hydroxyl group and an acryloyl group.

Examples of the urethane acrylate and urethane methacrylate of Component A include those containing constituents such as acrylic acid, methacrylic acid, acrylic acid ester, methacrylic acid ester, a polyol, and a diisocyanate. For example, at least one of the urethane acrylate and urethane methacrylate can be produced by using a polyol and at least one monomer selected from acrylic acid, methacrylic acid, acrylic acid ester, and methacrylic acid ester, preparing at least one of a hydroxyacrylate having at least one hydroxy group and a hydroxymethacrylate having at least one hydroxyl group, and allowing it to react with a diisocyanate.

In Component A, one type of urethane acrylate or urethane methacrylate may be used alone, or two types or more of them may be used in combination.

Examples of the acrylic acid ester include alkyl acrylates, cycloalkyl acrylates, etc. Examples of the alkyl acrylates include methyl acrylate, ethyl acrylate, isopropyl acrylate, butyl acrylate, etc. Examples of the cycloalkyl acrylates include cyclohexyl acrylate, etc. Examples of the methacrylic acid ester include alkyl methacrylates, cycloalkyl methacrylates, etc. Examples of the alkyl methacrylates include methyl methacrylate, ethyl methacrylate, isopropyl methacrylate, butyl methacrylate, etc. Examples of the cycloalkyl methacrylates include cyclohexyl methacrylate, etc.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, trimethylolpropane, glycerin, 3-methylpentane-1,3,5-triol, pentaerythritol, dipentaerythritol, tripentaerythritol, glucoses, etc.

The diisocyanate to be used herein can be any type of aromatic, aliphatic, or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4-diphenylmethane diisocyanate, and hydrogenated derivatives thereof.

The ratio of Component A to be added is not particularly limited. The use of Component A can improve the flexibility of the resulting hard-coating antiglare layer and adhesion of the resulting hard-coating antiglare layer with respect to the transparent plastic film substrate. From such viewpoints and the viewpoint of hardness of the hard-coating antiglare layer, the ratio of Component A to be added is, for example, 15 to 55% by weight, preferably 25 to 45% by weight, with respect to the entire resin components in the material for forming the hard-coating antiglare layer. The term "entire resin components" denotes the total amount of Components A, B, and C, or when other resin components are used, a sum of the total amount of the aforementioned three components and the total amount of the resin components. The same applies below.

Examples of Component B include pentaerythritol diacrylate, pentaerythritol triacrylate, pentaerythritol tetraacrylate, dipentaerythritol hexaacrylate, 1,6-hexanediol acrylate, pentaerythritol dimethacrylate, pentaerythritol trimethacrylate, pentaerythritol tetramethacrylate, dipentaerythritol hexamethacrylate, 1,6-hexanediol methacrylate, etc. These can be used alone. Two or more of them can be used in combination. Preferred examples of the polyol acrylate include a monomer component containing a polymer of pentaerythritol triacrylate and pentaerythritol tetraacrylate, and a component mixture containing pentaerythritol triacrylate and pentaerythritol tetraacrylate.

The ratio of Component B to be added is not particularly limited. The ratio of Component B to be added is preferably 70 to 180% by weight and more preferably 100 to 150% by weight, with respect to the amount of Component A. When the ratio of Component B to be added is 180% by weight or less with respect to the amount of Component A, the hard- coating antiglare layer to be formed can be effectively prevented from hardening and shrinking. As a result, the hard-coated antiglare film can be prevented from curling and the flexibility thereof can be prevented from deteriorating. When the ratio of Component B to be added is at least 70% by weight with respect to the amount of Component A, the hard-coating antiglare layer to be formed can have further improved hardness and improved scratch resistance.

In Component C, the alkyl groups of Components C1 and C2 are not particularly limited, for instance, the alkyl groups with a carbon number of 1 to 10. The alkyl groups can be of a straight chain. The alkyl groups can be of a branched-chain. For example, Component C can contain a polymer or copolymer containing a repeating unit represented by General Formula (1) indicated below, or a mixture of the polymer and the copolymer.

(1)

In General Formula (1), $R^1$ denotes —H or —$CH_3$, $R^2$ denotes —$CH_2CH_2OX$ or a group that is represented by General Formula (2) indicated below, and the X denotes —H or an acryloyl group that is represented by General Formula (3) indicated below.

(2)

(3)

In General Formula (2), the X denotes —H or an acryloyl group that is represented by General Formula (3), and Xs are identical to or different from each other.

Examples of Component C include a polymer, a copolymer, and a mixture of the polymer and the copolymer, with the polymer and a copolymer being formed of at least one monomer selected from the group consisting of 2,3-dihydroxypropyl acrylate, 2,3-diacryloyloxypropyl acrylate, 2-hydroxy-3-acryloyloxypropyl acrylate, 2-acryloyloxy-3-hydroxypropyl acrylate, 2,3-dihydroxypropyl methacrylate, 2,3-diacryloyloxypropyl methacrylate, 2-hydroxy-3-acryloyloxypropyl methacrylate, 2-acryloyloxy-3-hydroxypropyl methacrylate, 2-hydroxyethyl acrylate, 2-acryloyloxyethyl acrylate, 2-hydroxyethyl methacrylate, and 2-acryloyloxyethyl methacrylate.

The ratio of Component C to be added is not particularly limited. For instance, the ratio of Component C to be added is preferably 25 to 110% by weight and more preferably 45 to 85% by weight, with respect to the amount of Component A. When the ratio of Component C to be added is 110% by weight or lower with respect to the amount of Component A, the material for forming the hard-coating antiglare layer has excellent coating properties. When the ratio of Component C to be added is at least 25% by weight with respect to the amount of Component A, the hard-coating antiglare layer to be formed can be prevented from hardening and shrinking. As a result, in the hard-coated antiglare film, curling can be controlled.

The hard-coating antiglare layer contains fine particles to cause an uneven structure at its surface. The fine particles can be inorganic or organic fine particles, for example. The inorganic fine particles are not particularly limited. Examples of the inorganic fine particles include fine particles made of silicon oxide, titanium oxide, aluminum oxide, zinc oxide, tin oxide, calcium carbonate, barium sulfate, talc, kaolin, calcium sulfate, etc. The organic fine particles are not particularly limited. Examples thereof include polymethyl methacrylate acrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, polyethylene fluoride resin powder, etc. One type of the inorganic and organic fine particles can be used alone. Alternatively, two types or more of them can be used in combination.

As described above, the weight average particle size of the fine particles is preferably in the range of 6 to 10 μm. When the weight average particle size is at least 6 μm, the display contrast in bright light can be improved further effectively. When the weight average particle size is 10 μm or smaller, the hard-coating antiglare layer surface can have a further suitable uneven structure. The weight average particle size of the fine particles is preferably in the range of 7 to 9 μm, more preferably in the range of 7.5 to 8.5 μm. The weight average particle size of the fine particles can be measured by a Coulter counting method, for example. For the measurement of the weight average particle size of the fine particles, for instance, a particle size distribution measurement apparatus (trade name: Coulter Multisizer, manufactured by Beckman Coulter, Inc.) using a pore electrical resistance method is used to measure electrical resistance of an electrolyte corresponding to the volume of the fine particles when the fine particles pass through the pores. Thus, the number and volume of the fine particles are measured and then the weight average particle size is calculated.

The shape of the fine particles is not particularly limited. The fine particles can be in the form of substantially spherical beads or may be of an indefinite shape such as powder, for instance. The fine particles preferably have a substantially spherical shape, more preferably a substantially spherical shape with an aspect ratio of at most 1.5. This is because when the aspect ratio is at most 1.5, the average tilt angle θa of the unevenness of the hard-coating antiglare layer surface can be controlled more preferably. The aspect ratio is more preferably smaller than 1.05.

The ratio of the fine particles to be added is not particularly limited but can be determined suitably. With respect to 100 parts by weight of the entire resin components, the ratio of the fine particles to be added is, for instance, 2 to 70 parts by weight, preferably 4 to 50 parts by weight, more preferably 15 to 40 parts by weight.

From the viewpoints of preventing the occurrence of interference fringes or light scattering that is caused at the interfaces between the hard-coating antiglare layer and the fine particles, it is preferable that the difference in refractive index between the fine particles and the hard-coating antiglare layer be reduced. The interference fringes are phenomena that external light incident on the hard-coated antiglare film is reflected to produce rainbow color. Recently, three-wavelength fluorescent lamps featuring clear visibility are frequently used in offices, for example. Under the three-wavelength fluorescent lamps, the interference fringes appear conspicuously. Since the refractive index of the hard-coating antiglare layer is generally in the range of 1.4 to 1.6, the fine particles have preferably refractive indices close to the above-mentioned refractive index range. Preferably, the difference in refractive index between the fine particles and the hard-coating antiglare layer is smaller than 0.05.

The arithmetic average surface roughness Ra in the uneven shape of the hard-coating antiglare layer is not particularly limited. It is, for example, in the range of 0.03 to 0.3 μm, preferably in the range of 0.05 to 0.2 μm, and more preferably in the range of 0.07 to 0.15 μm. In addition, the average interval Sm between the concaves and convexes of the uneven shape of the hard-coating antiglare layer is not particularly limited. It is, for example, in the range of 50 to 150 μm, preferably in the range of 55 to 120 μm, and more preferably in the range of 60 to 100 μm. The arithmetic average surface roughness Ra and the average interval Sm between the concaves and convexes are specified in JIS B 0601 (1994 version) and can be measured by the method of an example described later, for example. In the present invention, the arithmetic average surface roughness Ra and the average interval Sm between the concaves and convexes can be adjusted by suitably selecting the type of the hard-coating resin, the thickness of the hard-coating antiglare layer, the type of the fine particles, the weight average particle size of the fine particles, etc. Any person skilled in the art can obtain the arithmetic average surface roughness Ra and the average interval Sm between the concaves and convexes in the predetermined ranges without carrying out an excessive amount of trial and error.

The difference d in refractive index between the transparent plastic film substrate and the hard-coating antiglare layer is preferably at most 0.04. When the difference d is at most 0.04, the interference fringes can be prevented from occurring. The difference d is more preferably at most 0.02.

The thickness of the hard-coating antiglare layer is 15 to 35 μm, preferably 15 to 30 μm. When the thickness is in the aforementioned predetermined ranges, the hard-coating antiglare layer has sufficiently high hardness (for example, a pencil hardness of at least 4H). In addition, curling can be prevented from occurring further effectively, as long as the thickness is in the predetermined ranges.

The hard-coated antiglare film of the present invention can be manufactured by, for example, preparing a material for forming a hard-coating antiglare layer including a hard-coating resin containing the three components, the fine particles, and a solvent; forming a coating film by applying the material for forming the hard-coating antiglare layer onto at least one surface of the transparent plastic film substrate; and forming the hard-coating antiglare layer by curing the coating film.

The solvent is not particularly limited. Examples of the solvent include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone, diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone (MIBK), 2-octanone, 2-pentanone, 2-hexanone, 2-heptanone, 3-heptanone, ethylene glycol monoethyl ether acetate, ethylene glycol monoethyl ether, ethylene glycol monobutyl ether, ethylene glycol monomethyl ether, propylene glycol monomethyl ether acetate, propylene glycol monomethyl ether, etc. One of these solvents or any combination of two or more of these solvents may be used. From the viewpoints of improving the adhesion between the transparent plastic film substrate and the hard-coating antiglare layer, the solvent contains ethyl acetate whose ratio to the whole is preferably at least 20% by weight, more preferably at least 25% by weight, and most preferably 30 to 70% by weight. When the ratio of the ethyl acetate in the solvent is 70% by weight or less, the solvent can have a suitable rate of volatilization and thereby unevenness in coating or drying can be effectively prevented from occurring. The type of the solvent to be used in combination with the ethyl acetate is not particularly limited. Examples of the solvent include butyl acetate, methyl ethyl ketone, ethylene glycol monobutyl ether, propylene glycol monomethyl ether, etc.

Various types of leveling agents can be added to the material for forming the hard-coating antiglare layer. The leveling agent may be, for example, a fluorochemical or silicone leveling agent, preferably a silicone leveling agent. Examples of the silicon leveling agent include a reactive silicone, polydimethylsiloxane, polyether-modified polydimethylsiloxane, polymethylalkylsiloxane, etc. Among these silicone leveling agents, the reactive silicone is particularly preferred. The reactive silicone added can impart lubricity to the surface and produce continuous scratch resistance over a long period of time. In the case of using a reactive silicone containing a hydroxyl group, when an antireflection layer (a low refractive index layer) containing a siloxane component is formed on the hard-coating antiglare layer, the adhesion between the antireflection layer and the hard-coating antiglare layer is improved.

The amount of the leveling agent to be added is, for example, at most 5 parts by weight, preferably in the range of 0.01 to 5 parts by weight, with respect to 100 parts by weight of entire resin components.

If necessary, the material for forming the hard-coating antiglare layer may contain a pigment, a filler, a dispersing agent, a plasticizer, an ultraviolet absorbing agent, a surfactant, an antioxidant, a thixotropy-imparting agent, or the like, as long as the performance is not degraded. One of these additives may be used alone, or two or more of these additives may be used together.

The material for forming the hard-coating antiglare layer can contain any conventionally known photopolymerization initiator. Examples of the applicable photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, and other thioxanthone compounds.

The material for forming the hard-coating antiglare layer may be applied onto the transparent plastic film substrate by any coating method such as fountain coating, die coating, spin coating, spray coating, gravure coating, roll coating, bar coating, etc.

The material for forming the hard-coating antiglare layer is applied to form a coating film on the transparent plastic film substrate and then the coating film is cured. Preferably, the coating film is dried before being cured. The drying can be carried out by, for instance, allowing it to stand, air drying by blowing air, drying by heating, or a combination thereof.

While the coating film formed of the material for forming the hard-coating antiglare layer may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably 50 to 5000 mJ/cm$^2$ in terms of accumulative exposure at an ultraviolet wavelength of 365 nm. When the amount of irradiation is at least 50 mJ/cm$^2$, the material for forming the hard-coating antiglare layer can be cured further sufficiently and the resulting hard-coating antiglare layer also has a sufficiently higher hardness. When the amount of irradiation is at most 5000 mJ/cm$^2$, the resulting hard-coating antiglare layer can be prevented from being colored and thereby can have improved transparency.

As described above, a hard-coated antiglare film of the present invention can be manufactured by forming the hard-coating antiglare layer on at least one surface of the transparent plastic film substrate. The hard-coated antiglare film of the present invention can be manufactured by manufacturing methods other than that described above. The hard-coated antiglare film of the present invention has a pencil hardness of at least 4H, for example. As described above, in the hard-coated antiglare film of the present invention, the total haze value ht is in the aforementioned predetermined range, while the total haze value ht and the inner haze value hi have the aforementioned relationship therebetween. In the present invention, the total haze value ht and the inner haze value hi can be adjusted by suitably selecting the type of the hard coating resin, the type, weight average particle size, and amount of the fine particles to be added, etc. without requiring persons skilled in the art carrying out an excessive amount of trial and error.

In the hard-coated antiglare film of the present invention, an antireflection layer (low-refractive-index layer) can be disposed on the hard-coating antiglare layer. Light incident on an object undergoes reflection at the interface and is absorbed and scattered repeatedly inside the object while traveling through it to reach the back side thereof. For instance, when a hard-coated antiglare film is attached to an image display, one of the factors of reducing the visibility of an image is light reflection at the interface between air and the hard-coating antiglare layer. The antireflection layer reduces such surface reflection.

In the present invention, the antireflection layer is a thin optical film having a strictly controlled thickness and refractive index, or a laminate including at least two layers of the thin optical films that are stacked together. In the antireflection layer, the antireflection function is produced by allowing opposite phases of incident light and reflected light to cancel each other out based on interference of light. The antireflection function should be produced in the visible light wavelength range of 380 to 780 nm, and the visibility is particularly high in the wavelength range of 450 to 650 nm. Preferably, the antireflection layer is designed to have a minimum reflectance at the center wavelength 550 nm of the range.

When the antireflection layer is designed based on interference of light, the interference effect can be enhanced by a method of increasing the difference in refractive index between the antireflection layer and the hard-coating antiglare layer. Generally, in an antireflection multilayer including two to five thin optical layers (each with strictly controlled thickness and refractive index) that are stacked together, components with different refractive indices from each other are used to form a plurality of layers with a predetermined thickness. Thus, the antireflection layer can be optically designed at a higher degree of freedom, the antireflection effect can be enhanced, and in addition, the spectral reflection characteristics can be made flat in the visible light range. Since each layer of the thin optical film must be precise in thickness, a dry process such as vacuum deposition, sputtering, CVD, etc. is generally used to form each layer.

For the antireflection multilayer, a two-layer laminate is preferred including a high-refractive-index titanium oxide layer (refractive index: about 1.8) and a low-refractive-index silicon oxide layer (refractive index: about 1.45) formed on the titanium oxide layer. A four-layer laminate is more preferable wherein a silicon oxide layer is formed on a titanium oxide layer, another titanium oxide is formed thereon, and then another silicon oxide layer is formed thereon. The formation of the antireflection layer of such a two- or four-layer laminate can evenly reduce reflection over the visible light wavelength range (for example, 380 to 780 nm).

The antireflection effect can also be produced by forming a thin monolayer optical film (an antireflection layer) on the hard-coating antiglare layer. The antireflection monolayer is generally formed using a coating method such as a wet process, for example, fountain coating, die coating, spin coating, spray coating, gravure coating, roll coating, or bar coating.

Examples of the material for forming an antireflection monolayer include: resin materials such as UV-curable acrylic resins; hybrid materials such as a dispersion of inorganic fine particles such as colloidal silica in a resin; and sol-gel materials containing metal alkoxide such as tetraethoxysilane and titanium tetraethoxide. Preferably, the material contains a fluorine group to impart anti-fouling surface properties. In terms of, for example, scratch resistance, the material preferably contains a large amount of an inorganic component, and the sol-gel materials are more preferable. Partial condensates of the sol-gel materials can be used.

The antireflection layer (the low-refractive-index layer) is preferably formed of a material that contains, as disclosed in JP-A No. 2004-167827, a siloxane oligomer with an ethylene glycol-equivalent number average molecular weight of 500 to 10000 and a fluorine compound having a polystyrene-equivalent number average molecular weight of at least 5000 and having a fluoroalkyl structure and a polysiloxane structure since both scratch resistance and low reflection can be obtained, for example.

The antireflection layer (the low-refractive-index layer) may contain an inorganic sol for increasing film strength. The inorganic sol is not particularly limited. Examples thereof include silica, alumina, magnesium fluoride, etc. Particularly, silica sol is preferred. The amount of the inorganic sol to be added is, for example, in the range of 10 to 80 parts by weight, based on 100 parts by weight of the total solids of the material for forming the antireflection layer. The size of the inorganic fine particles in the inorganic sol is preferably in the range of 2 to 50 nm, more preferably 5 to 30 nm.

The material for forming the antireflection layer preferably contains hollow spherical silicon oxide ultrafine particles. The silicon oxide ultrafine particles have preferably an average particle size of 5 to 300 nm, more preferably 10 to 200 nm. The silicon oxide ultrafine particles are in the form of hollow spheres each including a pore-containing outer shell in which a hollow is formed. The hollow contains at least one of a solvent and a gas that has been used for preparing the ultrafine particles. A precursor substance for forming the hollow of the ultrafine particle preferably remains in the hollow. The thickness of the outer shell is preferably in the range of about 1 to about 50 nm and in the range of approximately 1/50 to 1/5 of the average particle size of the ultrafine particles. The outer shell preferably includes a plurality of coating layers. In the ultrafine particles, the pore is preferably blocked, and the hollow is preferably sealed with the outer shell. This is because the antireflection layer holding a porous structure or a hollow of the ultrafine particles can have a reduced refractive index of the antireflection layer. The method of producing such hollow spherical silicon oxide ultrafine particles is preferably a method of producing silica fine particles as disclosed in JP-A No. 2000-233611, for example.

In the process of forming the antireflection layer (the low-refractive-index layer), while drying and curing may be performed at any temperature, they are performed at a temperature of, for example, 60 to 150° C., preferably 70 to 130° C., for a time period of, for instance, 1 minute to 30 minutes, preferably 1 minute to 10 minutes in view of productivity. After drying and curing, the layer may be further heated, so that a hard-coated antiglare film of high hardness including an antireflection layer can be obtained. While the heating may be performed at any temperature, it is performed at a temperature of, for example, 40 to 130° C., preferably 50 to 100° C., for a time period of, for instance, 1 minute to 100 hours, more preferably at least 10 hours in terms of improving scratch resistance. The temperature and the time period are not limited to the above range. The heating can be performed by a method using a hot plate, an oven, a belt furnace, or the like.

When the hard-coated antiglare film including the antireflection layer is attached to an image display, the antireflection layer may serve frequently as the uppermost surface and thus tends to be susceptible to stains from the external environment. Stains are more conspicuous on the antireflection layer than on, for instance, a simple transparent plate. In the antireflection layer, for example, deposition of stains such as fingerprints, thumbmarks, sweat, and hairdressings changes the surface reflectance, or the deposition stands out whitely to make the displayed content unclear. Preferably, an antistain layer formed of a fluoro-silane compound, a fluoro-organic compound, or the like is layered on the antireflection layer in order to impart the functions of antideposition and easy elimination of the stains.

With respect to the hard-coated antiglare film of the present invention, it is preferable that at least one of the transparent plastic film substrate and the hard-coating antiglare layer be subjected to a surface treatment. When the surface treatment is performed on the transparent plastic film substrate, adhesion thereof to the hard-coating antiglare layer, the polarizer, or the polarizing plate further improves. When the surface treatment is performed on the hard-coating antiglare layer, adhesion thereof to the antireflection layer, the polarizer, or the polarizing plate further improves. The surface treatment can be, for example, a low-pressure plasma treatment, an ultraviolet radiation treatment, a corona treatment, a flame treatment, or an acid or alkali treatment. When a triacetyl cellulose film is used for the transparent plastic film substrate, an alkali treatment is preferably used as the surface treatment. This alkali treatment can be carried out by allowing the surface of the triacetyl cellulose film to come into contact with an alkali solution, washing it with water, and drying it. The alkali solution can be a potassium hydroxide solution or a sodium hydroxide solution, for example. The normal concentration (molar concentration) of the hydroxide ions of the alkali solution is preferably in the range of 0.1 N (mol/L) to 3.0 N (mol/L), more preferably 0.5 N (mol/L) to 2.0 N (mol/L).

In a hard-coated antiglare film including the transparent plastic film substrate and the hard-coating antiglare layer formed on one surface of the transparent plastic film substrate, for the purpose of preventing curling, the surface opposite to the surface with the hard-coating antiglare layer formed thereon may be subjected to a solvent treatment. The solvent treatment can be carried out by allowing the transparent plastic film substrate to come into contact with a dissolvable or swellable solvent. With the solvent treatment, the transparent plastic film substrate can have a tendency to curl toward the other surface, which can cancel the force allowing the transparent plastic film substrate with the hard-coating antiglare layer to curl toward the hard-coating antiglare layer side and thus can prevent curling. Similarly, in the hard-coated antiglare film including the transparent plastic film substrate and the hard-coating antiglare layer formed on one surface of the transparent plastic film substrate, for the purpose of preventing curling, a transparent resin layer may be formed on the other surface. The transparent resin layer is, for example, a layer that is mainly composed of a thermoplastic resin, a radiation-curable resin, a thermo-setting resin, or any other reactive resin. In particular, a layer mainly composed of a thermoplastic resin is preferred.

The transparent plastic film substrate side of the hard-coated antiglare film of the present invention is generally bonded to an optical component for use in an LCD or ELD via a pressure-sensitive adhesive or an adhesive. Before the bonding, the transparent plastic film substrate surface may also be subjected to various surface treatments as described above.

For example, the optical component can be a polarizer or a polarizing plate. A polarizing plate including a polarizer and a transparent protective film formed on one or both surfaces of the polarizer is commonly used. If the transparent protective film is formed on both surfaces of the polarizer, the front and rear transparent protective films may be made of the same material or different materials. Polarizing plates are generally placed on both surfaces of a liquid crystal cell. Polarizing plates may be arranged such that the absorption axes of two polarizing plates are substantially perpendicular to each other.

Next, an optical device including a hard-coated film of the present invention stacked therein is described using a polarizing plate as an example. The hard-coated antiglare film of the present invention and a polarizer or polarizing plate may be laminated with an adhesive or a pressure-sensitive adhesive to form a polarizing plate having the function according to the invention.

The polarizer is not especially limited. Examples of the polarizer include: a film that is uniaxially stretched after a hydrophilic polymer film, such as a polyvinyl alcohol type film, a partially formalized polyvinyl alcohol type film, an ethylene-vinyl acetate copolymer type partially saponified film, etc., allowed to adsorb dichromatic substances such as iodine and a dichromatic dye; and polyene type oriented films, such as a dehydrated polyvinyl alcohol film, a dehydrochlorinated polyvinyl chloride film, etc. Especially, a polarizer formed of a polyvinyl alcohol type film and a dichromatic material such as iodine is preferred because it has a high polarization dichroic ratio. Although the thickness of the polarizer is not especially limited, the thickness of about 5 to 80 µm is commonly adopted.

A polarizer that is uniaxially stretched after a polyvinyl alcohol type film is dyed with iodine can be produced by dipping and dyeing a polyvinyl alcohol type film in an aqueous solution of iodine and then stretching it by 3 to 7 times the original length. The aqueous solution of iodine may contain boric acid, zinc sulfate, zinc chloride, etc., if necessary. Separately, the polyvinyl alcohol type film may be dipped in an aqueous solution containing boric acid, zinc sulfate, zinc chloride, etc. Furthermore, before dyeing, the polyvinyl alcohol type film may be dipped in water and rinsed if needed. Rinsing the polyvinyl alcohol type film with water allows soils and blocking inhibitors on the polyvinyl alcohol type film surface to be washed off and also provides an effect of preventing non-uniformity, such as unevenness of dyeing, that may be caused by swelling the polyvinyl alcohol type film. Stretching may be applied after dyeing with iodine or may be applied concurrently with dyeing, or conversely, dyeing with iodine may be applied after stretching. Stretching can be carried out in aqueous solutions, such as boric acid, potassium iodide, etc. or in water baths.

The transparent protective film formed on one or both surfaces of the polarizer preferably is excellent in transparency, mechanical strength, thermal stability, moisture-blocking properties, retardation value stability, or the like. Examples of the material for forming the transparent protective film include the same materials as those used for the transparent plastic film substrate.

Moreover, the polymer films described in JP-A No. 2001-343529 (WO01/37007) also can be used as the transparent protective film. The polymer films described in JP-A No. 2001-343529 are formed of, for example, resin compositions including (A) thermoplastic resins having at least one of a substituted imide group and a non-substituted imide group in the side chain thereof, and (B) thermoplastic resins having at least one of a substituted phenyl group and a non-substituted phenyl group and a nitrile group in the side chain thereof. Examples of the polymer films formed of the resin compositions described above include one formed of a resin composition including: an alternating copolymer containing isobutylene and N-methyl maleimide; and an acrylonitrile-styrene copolymer. The polymer film can be produced by extruding the resin composition in the form of film. The polymer film exhibits a small retardation and a small photoelastic coefficient and thus can eliminate defects such as unevenness due to distortion when a protective film or the like used for a polarizing plate. The polymer film also has low moisture permeability and thus has high durability against moistening.

In terms of polarizing properties, durability, and the like, cellulose resins such as triacetyl cellulose and norbornene resins are preferably used for the transparent protective film. Examples of the transparent protective film that are commercially available include FUJITAC (trade name) manufactured by Fuji Photo Film Co., Ltd., ZEONOA (trade name) manufactured by Nippon Zeon Co., Ltd., and ARTON (trade name) manufactured by JSR Corporation.

The thickness of the transparent protective film is not particularly limited. It is, for example, in the range of 1 to 500 μm in viewpoints of strength, workability such as a handling property, a thin layer property, etc. In the above range, the transparent protective film can mechanically protect a polarizer and can prevent a polarizer from shrinking and retain stable optical properties even when exposed to high temperature and high humidity. The thickness of the transparent protective film is preferably in the range of 5 to 200 μm and more preferably 10 to 150 μm.

The polarizing plate in which the hard-coated antiglare film is stacked is not particularly limited. The polarizing plate may be a laminate of the hard-coated antiglare film, the transparent protective film, the polarizer, and the transparent protective film that are stacked in this order or a laminate of the hard-coated antiglare film, the polarizer, and the transparent protective film that are stacked in this order.

Hard-coated antiglare films of the present invention and various optical devices, such as polarizing plates, including the hard-coated antiglare films can be preferably used in various image displays such as a liquid crystal display, etc.

The liquid crystal display of the present invention has the same configuration as those of conventional liquid crystal displays except for including a hard-coated film of the present invention. The liquid crystal display of the present invention can be manufactured by suitably assembling several parts such as a liquid crystal cell, optical components such as a polarizing plate, and, if necessity, a lighting system (for example, a backlight), and incorporating a driving circuit, for example. The liquid crystal cell is not particularly limited. The liquid crystal cell can be of any type such as TN type, STN type, π type, etc.

In the present invention, the configurations of liquid crystal displays are not particularly limited. The liquid crystal displays of the present invention include, for example, one in which the optical device is disposed on one side or both sides of a liquid crystal cell, one in which a backlight or a reflector is used for a lighting system, etc. In these liquid crystal displays, the optical device of the present invention can be disposed on one side or both sides of the liquid crystal cell. When disposing the optical devices in both the sides of the liquid crystal cell, they may be identical to or different from each other. Furthermore, various optical components and optical parts such as a diffusion plate, an antiglare layer, an antireflection film, a protective plate, a prism array, a lens array sheet, an optical diffusion plate, backlight, etc. may be disposed in the liquid crystal displays.

EXAMPLES

Next, examples of the present invention are described together with comparative examples. However, the present invention is not limited by the following examples and comparative examples.

Example 1

A resin material (GRANDIC PC1097 (trade name), manufactured by DAINIPPON INK AND CHEMICALS, INCORPORATED) was prepared. In the resin material, a resin component containing Component A, Component B, Component C, and the photopolymerization initiator described below was contained at a solid concentration of 66% by weight in the mixed solvent described below. Then 30 parts by weight of acrylic resin particles (with a weight average particle size of 8 μm and a refractive index of 1.49) and 0.5 part by weight of a leveling agent (PC-4133 (trade name), manufactured by DAINIPPON INK AND CHEMICALS, INCORPORATED) were added and mixed to 100 parts by weight of the resin material described above. This mixture was diluted with ethyl acetate so that a weight ratio of butyl acetate:ethyl acetate was 55:45 (i.e. the ratio of ethyl acetate to the whole solvent was 45% by weight) and the solid concentration was 55% by weight. Thus, a material for forming a hard-coating antiglare layer was prepared. The aforementioned reactive leveling agent is a copolymer obtained by copolymerizing dimethylsiloxane, hydroxypropylsiloxane, (6-isocyanate-hexyl)isocyanuric acid, and aliphatic polyester at a mole ratio of 6.3:1.0:2.2:1.0.

Component A: urethane acrylate produced with isophorone diisocyanate and pentaerythritol acrylate (100 parts by weight)

Component B: 38 parts by weight of dipentaerythritol hexaacrylate, 40 parts by weight of pentaerythritol tetraacrylate, and 15.5 parts by weight of pentaerythritol triacrylate Component C: a polymer or copolymer having a repeating unit represented by General Formula (1) described above, or a mixture of the polymer and copolymer (30 parts by weight)

Photopolymerization initiator: IRGACURE 184 (trade name, manufactured by Ciba Specialty Chemicals), 3 parts by weight Mixed solvent: butyl acetate:ethyl acetate (weight ratio)=89:11

The material for forming the hard-coating antiglare layer was applied onto a transparent plastic film substrate (an 80 μm-thick triacetyl cellulose film (with a refractive index of 1.48)) with a bar coater to form a coating film. Thereafter, the coating film was dried by heating it at 100° C. for one minute. The coating film that had been dried was irradiated with ultraviolet light at an accumulated light intensity of 300 mJ/cm$^2$ using a metal halide lamp to be cured. Thus, a hard-coating antiglare layer with a thickness of 17.7 μm was formed. The hard-coating antiglare layer had a refractive index of 1.51. In this manner, a hard-coated antiglare film according to the present example was produced.

Example 2

In this example, a hard-coated antiglare film was produced in the same manner as in Example 1 except that the fine particles used herein were acrylic resin particles (whose refractive index was 1.49) with a weight average particle size of 10 μm while the thickness of the hard-coating antiglare layer was 20.4 μm.

Example 3

In this example, a hard-coated antiglare film was produced in the same manner as in Example 1 except that the thickness of the hard-coating antiglare layer was changed to 30.4 μm.

Example 4

In this example, a hard-coated antiglare film was produced in the same manner as in Example 1 except that the leveling agent used herein was a fluorine leveling agent while the thickness of the hard-coating antiglare layer was 26.4 μm.

Example 5

In this example, a hard-coated antiglare film of Example 4 was produced and further an antireflection layer was formed on the hard-coating antiglare layer. That is, first, 54 parts by weight of tetraalkoxysilane, 23 parts by weight of a silane coupling agent having a fluoroalkyl structure and a polysiloxane structure, and 23 parts by weight of hollow and spherical silicon oxide ultrafine particles with a diameter of 60 nm that had been subjected to a surface treatment carried out with a silane coupling agent having an acrylic group to be hydrophobized were dispersed in a mixed solvent (isopropyl alcohol:butyl acetate:MIBK=54:14:32 (weight ratio)), and then the solid concentration was adjusted to 2.0% by weight. Thus, a material for forming an antireflection layer was prepared. This material for forming an antireflection layer was applied onto the hard-coating antiglare layer and then was dried and cured. Thus, an antireflection layer with a thickness of 26.4 μm was formed and thereby a hard-coated antiglare film with an antireflection layer was obtained.

Example 6

In this example, a hard-coated antiglare film was produced in the same manner as in Example 1 except that 15 parts by weight of acrylic resin particles (whose refractive index was 1.49) with a weight average particle size of 5 μm were used as the fine particles, the solid concentration was 35% by weight, and the thickness of the hard-coating antiglare layer was 23.8 μm.

Example 7

In this example, a hard-coated antiglare film was produced in the same manner as in Example 1 except that 65 parts by weight of acrylic resin particles (whose refractive index was 1.49) with a weight average particle size of 5 μm were used as the fine particles, the solid concentration was 35% by weight, and the thickness of the hard-coating antiglare layer was 23.8 μm.

Comparative Example 1

100 parts by weight of an ultraviolet-curable resin composed of triacrylate isocyanurate, pentaerythritol triacrylate, dipentaerythritol hexaacrylate, and isophorone diisocyanate polyurethane, 0.5 part by weight of a leveling agent (DEFENSA MCF323, manufactured by DAINIPPON INK AND CHEMICALS, INCORPORATED), 14 parts by weight of polystyrene particles (SX350H (trade name), manufactured by Soken Chemical & Engineering Co., Ltd., with a weight average particle size of 3.5 μm), and 5 parts by weight of a photopolymerization initiator (Irgacure 184 (trade name), manufactured by Ciba Specialty Chemicals) were dissolved or dispersed in a mixed solvent (toluene:butyl acetate:ethyl acetate=86.5:1.0:12.5 (weight ratio)) so that the solid concentration was 45% by weight. Thus, a material for forming a hard-coating antiglare layer was prepared.

This material for forming a hard-coating antiglare layer was applied onto a transparent plastic film substrate (a triacetyl cellulose film with a thickness of 80 μm and a refractive index of 1.48) with a bar coater. Thus, a coating film was formed. After the application, it was heated at 100° C. for three minutes, so that the coating film was dried. The coating film thus dried was irradiated with ultraviolet light at an accumulated light intensity of 300 mJ/cm$^2$ using a metal halide lamp and thereby the coating film was cured to form a 5-μm thick hard-coating antiglare layer. Thus, the hard-coated antiglare film of this comparative example was produced. The hard-coating antiglare layer had a refractive index of 1.53.

Comparative Example 2

In this comparative example, a hard-coated antiglare film according to this comparative example was obtained in the same manner as in Example 1 except that the amount of the acrylic resin particles to be added was 10 parts by weight.

Comparative Example 3

100 parts by weight of an ultraviolet-curable resin composed of triacrylate isocyanurate, pentaerythritol triacrylate, dipentaerythritol hexaacrylate, and isophorone diisocyanate polyurethane, 0.5 part by weight of a leveling agent (MEGAFACE F-470N, manufactured by DAINIPPON INK AND CHEMICALS, INCORPORATED), 6.5 parts by weight of amorphous silica particles (SYLOPHOBIC 702 (trade name), manufactured by FUJI SILYSIA CHEMICAL LTD.) whose average particle size was 2.5 μm, 6.5 parts by weight of amorphous silica particles (SYLOPHOBIC 200, manufactured by FUJI SILYSIA CHEMICAL LTD.) whose average particle size was 1.7 μm, and 5 parts by weight of a photopolymerization initiator (Irgacure 184 (trade name), manufactured by Ciba Specialty Chemicals) were dissolved or dispersed in a mixed solvent (toluene:butyl acetate=85:15 (weight ratio)) so that the solid concentration was 38% by weight. Thus, a material for forming a hard-coating antiglare layer was prepared. This material for forming a hard-coating antiglare layer was applied onto a transparent plastic film substrate (a triacetyl cellulose film with a thickness of 80 μm and a refractive index of 1.48) with a bar coater. Thus, a coating film was formed. After the application, it was heated at 100° C. for three minutes, so that the coating film was dried. The coating film thus dried was irradiated with ultraviolet light at an accumulated light intensity of 300 mJ/cm$^2$ using a metal halide lamp and thereby the coating film was cured to form a 5-μm thick hard-coating antiglare layer. Thus, the hard-coated antiglare film of this comparative example was obtained. The hard-coating antiglare layer had a refractive index of 1.53.

Evaluation

In the respective examples and comparative examples, various characteristics were evaluated or measured by the following methods.

Thickness of Hard-Coating Antiglare Layer

A thickness gauge (microgauge type manufactured by Mitutoyo Corporation) was used to measure the total thickness of the hard-coated antiglare film. The thickness of the transparent plastic film substrate was subtracted from the total thickness. Thus, the thickness of the hard-coating antiglare layer (HC) was calculated.

Thickness of Antireflection Layer

An instantaneous multichannel photodetector system (MCPD-2000 (trade name) manufactured by Otsuka Electronics Co., Ltd.) was used and the thickness of the antireflection layer was calculated from the waveform data of the resulting interference spectrum.

Total Haze Value ht

The total haze value ht was measured using a Hazemeter HR300 (trade name, manufactured by Murakami Color Research Laboratory) according to haze (cloudiness) defined in JIS K7136 (1981 version).

Inner Haze Value hi

First, as shown in FIG. 2, the uneven surface of the hard-coating antiglare layer 2 formed on the transparent plastic film substrate 1 was made to be a smooth surface 4 using the hard-coating resin and then the haze value A was measured in the same manner as in the case of the total haze value ht. On the other hand, with respect to the haze value B, as shown in FIG. 3, a hard-coating layer 5 with a smooth surface was formed of the hard-coating resin alone on the transparent plastic film substrate 1, and then the haze value of the whole laminate including the transparent plastic film substrate and the hard-coating layer was measured in the same manner as in the case of the total haze value ht. Then the haze value B was subtracted from the haze value A and thus the inner haze value hi was calculated.

Glare

A hard-coated antiglare film was bonded to a 1.3-mm thick glass sheet by the surface to which the hard-coating antiglare layer had not been formed. Thus, a sample was obtained. This sample was set on a lattice-like pattern placed above a backlight. The lattice-like pattern used herein had an opening with a size of 90 μm×20 μm, a vertical line width of 20 μm, and a horizontal line width of 40 μm. The distance from the lattice-like pattern to the hard-coating antiglare layer was 1.3 mm, while the distance from the backlight to the lattice-like pattern was 1.5 mm. Then glare of the hard-coated antiglare film was judged visually according to the following criteria:

A: level with almost no glare,

B: level with glare but with a small effect on visibility,

C: level with glare but with no problem in practical use, and

D: level with considerable glare and problems in practical use.

Pencil Hardness

An adhesive layer with a thickness of about 20 μm was formed on the surface of the hard-coated antiglare film on which the hard-coating antiglare layer had not been formed. Then a glass sheet was bonded to the hard-coated antiglare film, with the adhesive layer being interposed therebetween. Thus, a sample was prepared. Thereafter, the pencil hardness of the surface of the hard-coating antiglare layer of the sample was measured according to the pencil hardness test described in JIS K-5400 (with a load of 500 g).

Average Tilt Angle θa, Arithmetic Average Surface Roughness Ra, and Average Interval Sm Between Concaves and Convexes A glass sheet (with a thickness of 1.3 mm) manufactured by MATSUNAMI GLASS IND., LTD. was bonded to the surface of the hard-coated antiglare film on which the hard-coating antiglare layer had not been formed, with an adhesive. Then the surface shape of the hard-coating antiglare layer was measured using a high-precision micro figure measuring instrument (trade name: Surfcorder ET4000, manufactured by Kosaka Laboratory Ltd.). Thus, the average tilt angle θa, arithmetic average surface roughness Ra, and average interval Sm between concaves and convexes were determined. The high-precision micro figure measuring instrument automatically calculates the average tilt angle θa, arithmetic average surface roughness Ra, and average interval Sm between concaves and convexes.

Antiglare Properties (1) A black acrylic plate (with a thickness of 2.0 mm, manufactured by MITSUBISHI RAYON CO., LTD.) was bonded to the surface of the hard-coated antiglare film on which the hard-coating antiglare layer had not been formed, with an adhesive. Thus, a sample was prepared that had a back surface with no reflection.

(2) In an office environment (about 1000 Lx) where general displays are used, the antiglare properties of the sample were judged visually according to the following criteria:

A: image reflection is hardly observed,

B: image reflection is observed but has a little effect on visibility,

C: image reflection is observed with no problem in practical use, and

D: image reflection is observed with a problem in practical use.

White Blur: Black Sharpness (1) An acrylic adhesive layer with a thickness of about 20 μm was formed on the surface of the hard-coated antiglare film on which the hard-coating antiglare layer had not been formed.

Then a polarizing plate with a smooth surface was bonded to the hard-coated antiglare film, with the acrylic adhesive layer being interposed therebetween. Thus, a polarizing plate with a hard-coated antiglare film was produced.

(2) The polarizing plate with a hard-coated antiglare film was attached to a liquid crystal panel (trade name: LQ150X1LAJO, manufactured by Sharp Corporation).

(3) In an office environment (about 1000 Lx) where general displays are used, the liquid crystal panel was operated to produce a black display and thereby the depth of black was judged visually according to the following criteria:

A: very high blackness was observed,

B: high blackness was observed,

C: slight whiteness was observed with no problem in practical use, and

D: white blur occurred with a problem in practical use.

One, in which no white blur occurs and high blackness is observed, can be considered to have excellent display contrast in bright light.

Refractive Indices of Transparent Plastic Film Substrate and Hard-Coating Antiglare Layer The refractive indices of the transparent plastic film substrate and hard-coating antiglare layer were measured with an Abbe refractometer (trade name: DR-M4/1550, manufactured by Atago Co. Ltd.) according to the measuring method prescribed for the apparatus, with monobromonaphthalene being used for an intermediate wave, and with measuring light being allowed to be incident on the measuring planes of the transparent plastic film substrate and hard-coating antiglare layer.

Refractive Index of Fine Particles

Fine particles were placed on a slide glass, and a refractive index standard solution was dropped on the fine particles. Thereafter, a cover glass was placed thereon. Thus, a sample was prepared. The sample was observed with a microscope and thereby the refractive index of the refractive index standard solution that was obtained at the point where the profiles of the fine particles were most difficult to view at the interface with the refractive index standard solution was used as the refractive index of the fine particles.

Weight Average Particle Size of Fine Particles

By the Coulter counting method, a particle size distribution measurement apparatus (trade name: Coulter Multisizer, manufactured by Beckman Coulter, Inc.) using a pore electrical resistance method was employed to measure electrical resistance of an electrolyte corresponding to the volumes of the fine particles when the fine particles passed through the pores. Thus, the number and volume of the fine particles were measured and then the weight average particle size of the fine particles was calculated.

Aspect Ratio

A photograph of fine particles was taken with a scanning electron microscope (SEM). From this photograph, the ratio between the maximum diameter of the fine particles and the maximum length in the direction perpendicular to the maximum diameter was calculated. Thus, the aspect ratio was determined.

Table 1 below indicates conditions for producing the respective hard-coated antiglare films of the examples and comparative examples. Table 2 below indicates results of measurement or evaluation of various properties.

TABLE 1

|  | HC Thickness ($\mu$m) | Material of Fine Particles | Refractive Index of Fine Particles | Amount of Fine Particles (parts by weight) | Average Particle Diameter of Fine Particles ($\mu$m) | Aspect Ratio of Fine Particles | Refractive Index of Resin |
|---|---|---|---|---|---|---|---|
| Example 1 | 17.7 | Acrylic Resin | 1.49 | 30 | 8 | <1.05 | 1.52 |
| Example 2 | 20.4 | Acrylic Resin | 1.49 | 30 | 10 | <1.05 | 1.52 |
| Example 3 | 30.4 | Acrylic Resin | 1.49 | 30 | 8 | <1.05 | 1.52 |
| Example 4 | 26.4 | Acrylic Resin | 1.49 | 30 | 8 | <1.05 | 1.52 |
| Example 5 | 26.4 | Acrylic Resin | 1.49 | 30 | 8 | <1.05 | 1.52 |
| Example 6 | 23.8 | Acrylic Resin | 1.49 | 15 | 5 | <1.05 | 1.52 |
| Example 7 | 23.8 | Acrylic Resin | 1.49 | 65 | 5 | <1.05 | 1.52 |
| Comparative Example 1 | 5 | Styrene Resin | 1.59 | 14 | 3.5 | <1.05 | 1.53 |
| Comparative Example 2 | 17.7 | Acrylic Resin | 1.49 | 10 | 8 | <1.05 | 1.52 |
| Comparative Example 3 | 5 | Amorphous Silica | 1.46 | 6.5/6.5 | 2.5/1.7 | $\geq$1.05 | 1.53 |

TABLE 2

|  | Haze | | Surface Shape | | | Pencil Hardness | Anti-glare Properties | White Blur | Glare |
|---|---|---|---|---|---|---|---|---|---|
|  | hi (%) | ht (%) | Ra (μm) | Sm (μm) | θa degree | | | | |
| Example 1 | 43.7 | 41.2 | 0.081 | 60 | 0.89 | 4H | B | B | B |
| Example 2 | 47.6 | 42.7 | 0.127 | 79 | 1.12 | 4H | A | C | B |
| Example 3 | 65.1 | 64.5 | 0.074 | 67 | 0.73 | 4H | B | B | B |
| Example 4 | 55.5 | 53.6 | 0.078 | 65 | 0.75 | 4H | B | B | B |
| Example 5 | 54.7 | 53.8 | 0.065 | 72 | 0.61 | 4H | B | A | B |
| Example 6 | 47.1 | 46.2 | 0.042 | 79 | 0.37 | 4H | C | A | B |
| Example 7 | 69.8 | 68.9 | 0.135 | 64 | 1.65 | 4H | A | C | B |
| Comparative Example 1 | 34.1 | 45.4 | 0.168 | 112 | 1.72 | 3H | A | D | B |
| Comparative Example 2 | 29.7 | 29.7 | 0.053 | 102 | 0.34 | 4H | D | A | C |
| Comparative Example 3 | 11.6 | 12.3 | 0.203 | 90 | 2.09 | 3H | A | D | D |

As indicated in Table 2 above, all the hard-coated antiglare films of the examples were excellent in antiglare properties, white blur, and glare. On the other hand, in the hard-coated antiglare film of Comparative Example 1, the hardness was not sufficiently high and white blur occurred. Furthermore, the hard-coated antiglare film of Comparative Example 2 was poor in antiglare properties, while the hard-coated antiglare film of Comparative Example 3 was poor in properties of hardness, white blur, and glare.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hard-coated antiglare film, comprising:
   a transparent plastic film substrate; and
   a hard-coating antiglare layer that is formed on at least one surface of the transparent plastic film substrate and is formed of a material for forming the hard-coating antiglare layer, the material containing fine particles and a hard-coating resin,
   wherein the hard-coating resin contains Component A, Component B, and Component C,
   wherein Component A is at least one of urethane acrylate and urethane methacrylate,
   Component B is at least one of polyol acrylate and polyol methacrylate, and
   Component C is a polymer or copolymer that is formed of at least one of Components C1 and C2 or a mixed polymer of the polymer and the copolymer,
   wherein Component C1 is alkyl acrylate having an alkyl group containing at least one of a hydroxyl group and an acryloyl group, and
   Component C2 is alkyl methacrylate having an alkyl group containing at least one of a hydroxyl group and an acryloyl group, and
   the ratio of the fine particles is 15 to 70 parts by weight with respect to 100 parts by weight of the entire resin components,
   the hard-coating antiglare layer has a surface with an uneven structure,
   the hard-coated antiglare film has a total haze value ht in a range of 40 to 70%, and
   a relationship between the total haze value ht and an inner haze value hi obtained due to scattering inside the hard-coating antiglare layer is a relationship of the total haze value ht<the inner haze value hi,
   where the total haze value ht is a haze value of the whole hard-coated antiglare film,
   the inner haze value hi=a haze value A−a haze value B,
   the haze value A is a haze value of a whole hard-coated antiglare film that is obtained by forming a smooth surface of a hard-coating resin alone on said hard-coating antiglare layer of said hard-coating antiglare film, wherein said smooth surface of a hard-coating resin alone is made from a same resin as said hard-coating resin, and
   the haze value B is a haze value of a whole laminate that is obtained by forming a hard-coating resin alone on a transparent plastic film substrate, wherein said hard-coating resin alone layer is made the same as said hard-coating antiglare later except that it is made of the hard-coating resin alone and said transparent plastic film substrate is made the same as said transparent plastic film substrate of said hard-coating antiglare film.

2. The hard-coated antiglare film according to claim 1, wherein an average tilt angle θa of the unevenness of the hard-coating antiglare layer surface is in the range of 0.4° to 1.5°.

3. The hard-coated antiglare film according to claim 1, wherein the fine particles have a weight average particle size in a range of 6 to 10 μm.

4. The hard-coated antiglare film according to claim 1, further comprising an antireflection layer formed on the hard-coating antiglare layer.

5. The hard-coated antiglare film according to claim 4, wherein the antireflection layer contains hollow spherical silicon oxide ultrafine particles.

6. A polarizing plate, comprising a polarizer and the hard-coated antiglare film according to claim 1.

7. An image display, comprising the polarizing plate according to claim 6.

8. An image display, comprising the hard-coated antiglare film according to claim 1.

* * * * *